United States Patent Office 3,829,404
Patented Aug. 13, 1974

---

3,829,404
STABILIZATION OF SYNTHETIC POLYMERS WITH CERTAIN PIPERIDINO-THIAZOLINE COMPOUNDS
Keisuke Murayama, Syoji Morimura, Hideo Horiuchi, Katsuaki Matsui, Tomoyuki Kurumada, and Noriyuki Ohta, Tokyo, Japan, assignors to Sankyo Company Limited
No Drawing. Filed Oct. 20, 1972, Ser. No. 299,340
Claims priority, application Japan, Oct. 29, 1971, 46/86,071
Int. Cl. C08f 45/60; C08g 51/60
U.S. Cl. 260—45.8 SN                        8 Claims

ABSTRACT OF THE DISCLOSURE

Synthetic polymer compositions, particularly polyurethane compositions, stabilized against their deteriorations which contain at least one of 6-substituted or unsubstituted-5,5,7,7-tetramethylpiperidino-[5.4 - c]-$\Delta^3$-thiazoline-2-spiro-4'-(1'-substituted or unsubstituted-2',2',6',6'-tetramethylpiperidine) compounds. Such piperidino-thiazoline compounds are prepared by reacting the corresponding 2,2,6,6-tetramethyl-piperidine-4-one with elementary sulfur under the stream of gaseous $NH_3$ or by reacting 5,5,7,7-tetramethylpiperidino-[5.4-c] - $\Delta^3$ - thiazoline-2-spiro-4'-(2',2',6',6'-tetramethylpiperidine) with the corresponding halide.

---

This invention relates to the stabilization of synthetic polymers and certain new groups of piperidino-thiazoline derivatives.

More particularly, this invention is concerned with a synthetic polymer composition stabilized against photo- and thermal-deteriorations wherein there is incorporated, in a sufficient amount to prevent such deteriorations, at least one of the piperidino-thiazoline derivatives having the formula

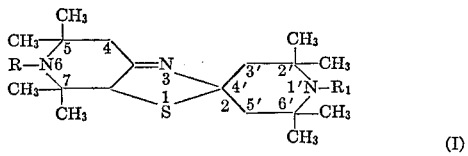

(I)

wherein R and $R_1$ may be the same or different and each represents hydrogen atom, an alkyl group, an alkenyl group, an alkynyl group, an aralkyl group, a substituted alkyl group, an aliphatic acyl group, an alkoxycarbonyl group or an aralkoxycarbonyl group.

This invention is also concerned with a new class of the piperidino-thiazoline derivatives having the formula

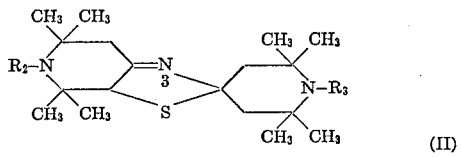

(II)

wherein $R_2$ and $R_3$ may be the same or different and each represents hydrogen atom, an alkyl group, an alkenyl group, a alkynyl group, an aralkyl group, a substituted alkyl group, an aliphatic acyl group, an alkoxycarbonyl group or an aralkoxycarbonyl group, provided that, where one of $R_2$ and $R_3$ is hydrogen atom, the other is any of the above-defined groups other than hydrogen atom and, where one of $R_2$ and $R_3$ is methyl group, the other is any of the above-defined groups other than methyl group.

In the above formula (I), the groups represented by R or $R_1$ may be illustratively exemplified by the followings:

Hydrogen atom; alkyl groups, preferably $C_1$–$C_4$ alkyl groups, e.g., methyl, ethyl, propyl and butyl; alkenyl groups, preferably $C_3$–$C_4$ alkenyl groups, e.g., allyl, propenyl and butenyl; alkynyl groups, preferably $C_3$–$C_5$ alkynyl groups, e.g., propynyl and pentynyl; aralkyl groups, preferably aralkyl groups which may be substituted with halogen, alkyl or alkoxy in the aryl moiety, e.g., benzyl, phenethyl, p-methylbenzyl, p-methoxybenzyl and o-chlorobenzyl; substituted alkyl groups including hydroxyalkyl groups, e.g., 2-hydroxyethyl, $C_1$–$C_8$ alkoxyalkyl groups, e.g., 2-methoxyethyl, 2-octoxyethyl, ethoxymethyl and 2-propoxybutyl, saturated or unsaturated aliphatic or aromatic acyloxyalkyl groups, e.g., 2-acetoxyethyl, 2-propionyloxyethyl, 3-butyryloxypropyl, benzoyloxymethyl, 2-benzoyloxyethyl, 2-acryloyloxyethyl and methacryloyloxymethyl, epoxyalkyl groups, e.g., 2,3-epoxypropyl, cyanoalkyl groups, e.g., cyanomethyl and 2-cyanoethyl and halogenoalkyl groups, e.g., chloromethyl, 2-chloroethyl and 3-bromopropyl, alkoxycarbonylalkyl groups, preferably alkoxycarbonylalkyl groups having 1 to 8 carbon atoms in the alkoxy moiety, e.g., methoxycarbonylmethyl, ethoxycarbonylmethyl, 2-butoxycarbonylethyl and octoxycarbonylmethyl; aliphatic acyl groups, preferably saturated or unsaturated acyl groups having 2 to 4 carbon atoms, e.g., acetyl, propionyl, butyryl, acryloyl and crotonoyl; alkoxycarbonyl groups, preferably alkoxycarbonyl groups having 1 to 4 carbon atoms in the alkoxy moiety, e.g., ethoxycarbonyl and butoxycarbonyl; and aralkoxycarbonyl groups, preferably aralkoxycarbonyl groups having 1 to 3 carbon atoms in the alkoxy moiety and 6 to 10 carbon atoms in the aryl moiety, e.g., benzyloxycarbonyl and phenethyloxycarbonyl.

The term "synthetic polymer" as used herein are intended to embrace:

polyolefins including homopolymers of olefins such as low-density and high-density polyethylene, polypropylene, polystyrene, polybutadiene, polyisoprene and the like, and copolymers of olefins with other ethylenically unsaturated monomers such as ethylenepropylene copolymer, ethylene-butene copolymer, ethylene-vinyl acetate copolymer, styrene-butadiene copolymer, acrylonitrile-styrene-butadiene copolymer and the like;

polyvinyl chlorides and polyvinylidene chlorides including homopolymer of each of vinyl chloride and vinylidene chloride, vinyl chloride-vinylidene chloride copolymer and copolymers of each of vinyl chloride and vinylidene chloride with vinyl acetate or other ethylenically unsaturated monomers;

polyacetals such as polyoxymethylene and polyoxyethylene;

polyesters such as polyethylene terephthalate;

polyamides such as 6-nylon, 6,6-nylon and 6,10-nylon; and polyurethanes.

Synthetic polymers have been widely utilized in the art, in view of their excellent properties, in various forms or shapes, for example, filament, fibre, yarn, film, sheet, other molded article, latex and foam. However, these polymers have some drawbacks such as poor light- and heat-stabilities and the like. Stated illustratively, polyolefins and polyurethane elastomers frequently tend to undergo severe deterioration when exposed to light such as sunlight or ultraviolet ray, and polyvinyl chloride and polyvinylidene chloride frequently tend to deteriorate and become colored by the action of light and heat together with elimination of hydrogen chloride therefrom. Polyamides are also frequently subjected to photo-deterioration. For the purpose of stabilizing these synthetic polymers against such deterioration, there have heretofore been proposed in the art a number of stabilizers; for example, for polyolefins, benzotriazole compounds and benzophenone compounds; for polyurethanes, phenol compounds and benzophenone compounds; and for polyvinyl chloride and polyvinylidene chloride, lead salts such as basic lead silicate and tribasic lead maleate, and organotin compounds such as dibutyltin laurate and dibutyltin maleate.

Although such prior stabilizers are believed to be considerably satisfactory, some problems to be improved still remain.

Thus, numerous attempts have been made in the art to find and develop new and more effective stabilizers.

As a result of our extensive studies, it has now been found that the piperidino-thiazoline derivatives (I) exhibit a high stabilizing effect against photo- and thermal-deterioration of the synthetic polymers; in particular, a highly superior stabilizing effect on polyurethanes, especially polyurethane elastomers, against prolonged outdoor exposure and repeated cleanings to that of the known phenol-type stabilizers.

The primary object of this invention is to provide a synthetic polymer composition stabilized against the deterioration thereof having incorporated therein, in a sufficient amount to prevent the deterioration, at least one of the piperidino-thiazoline derivatives (I).

Another object of this invention is to provide a certain new group of the piperidino-thiazoline derivatives (II) which are useful as stabilizers for various synthetic polymers.

Other objects of this invention will become apparent to those skilled in the art from the following description.

In one aspect of this invention, there is provided a synthetic polymer composition stabilized against photo- and thermal-deterioration which contains at least one of the piperidino-thiazoline derivatives (I) having incorporated therein.

Of the piperidino-thiazoline derivatives having the above formula (I), a preferred class can be represented by the following formula

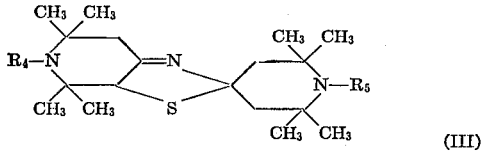

(III)

wherein $R_4$ and $R_5$ may be the same or different and each represents hydrogen atom, methyl group, allyl group, benzyl group, ethoxycarbonylmethyl group and acryloyl group, in view of their stabilizing effect against deteriorations of various synthetic polymers.

Representative examples of the piperidino-thiazoline derivatives (I) which may be employed as a stabilizer in this invention are illustratively given below, but they are not intended to be limiting the scope of this invention.

| Compound No. | Chemical name |
|---|---|
| 1 | 5,5,7,7-tetramethylpiperidino-[5.4-c]-$\Delta^3$-thiazoline-2-spiro-4'-(2',2',6',6'-tetramethylpiperidine). |
| 2 | 5,5,6,7,7-pentamethylpiperidino-[5.4-c]-$\Delta^3$-thiazoline-2-spiro-4'-(1',2',2',6',6'-pentamethylpiperidine). |
| 3 | 5,5,7,7-tetramethylpiperidino-[5.4-c]-$\Delta^3$-thiazoline-2-spiro-4'-[2',2',6',6'-tetramethyl-1'-(2-propynyl)-piperidine]. |
| 4 | 6-allyl-5,5,7,7-tetramethylpiperidino-[5.4-c]-$\Delta^3$-thiazoline-2-spiro-4'-(1'-allyl-2',2',6',6'-tetramethylpiperidine). |
| 5 | 6-benzyl-5,5,7,7-tetramethylpiperidino-[5.4-c]-$\Delta^3$-thiazoline-2-spiro-4'-(1'-benzyl-2',2',6',6'-tetramethylpiperidine). |
| 6 | 5,5,7,7-tetramethylpiperidino-[5.4-c]-$\Delta^3$-thiazoline-2-spiro-4'-[1'-(2-hydroxyethyl)-2',2',6',6'-tetramethylpiperidine]. |
| 7 | 6-ethyl-5,5,7,7-tetramethylpiperidino-[5.4-c]-$\Delta^3$-thiazoline-2-spiro-4'-(1'-ethyl-2',2',6',6'-tetramethylpiperidine). |
| 8 | 5,5,7,7-tetramethylpiperidion-[5.4-c]-$\Delta^3$-thiazoline-2-spiro-4'-[1'-(2-acetoxyethyl)-2',2',6',6'-tetramethylpiperidine]. |
| 9 | 5,5,6,7,7-pentamethylpiperidino-[5.4-c]-$\Delta^3$-thiazoline-2-spiro-4'-[1'-(2-methoxyethyl)-2',2',6',6'-tetramethylpiperidine]. |
| 10 | 5,5,7,7-tetramethylpiperidino-[5.4-c]-$\Delta^3$-thiazoline-2-spiro-4'-[1'-(2,3-epoxypropyl)-2',2',6',6'-tetramethylpiperidine]. |

TABLE—Continued

| Compound No. | Chemical name |
|---|---|
| 11 | 6-cyanomethyl-5,5,7,7-tetramethylpiperidino-[5.4-c]-$\Delta^3$-thiazoline-2-spiro-4'-(1'-cyanomethyl-2',2',6',6'-tetramethylpiperidine). |
| 12 | 5,5,7,7-tetramethylpiperidino-[5.4-c]-$\Delta^3$-thiazoline-2-spiro-4'-[1'-(2-chloroethyl)-2',2',6',6'-tetramethylpiperidine]. |
| 13 | 6-ethoxycarbonylmethyl-5,5,7,7-tetramethylpiperidino-[5.4-c]-$\Delta^3$thiazoline-2-spiro-4'-(1'-ethoxycarbonylmethyl-2',2',6',6'-tetramethylpiperidine). |
| 14 | 6-acryloyl-5,5,7,7-tetramethylpiperidino-[5.4-c]-$\Delta^3$-thiazoline-2-spiro-4'-(1'-acryloyl-2',2',6',6'-tetramethylpiperidine). |
| 15 | 6-benzyloxycarbonyl-5,5,7,7-tetramethylpiperidino-[5.4-c]-$\Delta^3$-thiazoline-2-spiro-4'-(1'-benzoyloxycarbonyl-2',2',6',6'-tetramethylpiperidine). |
| 16 | 6-ethoxycarbonyl-5,5,7,7-tetramethylpiperidino-[5.4-c]-$\Delta^3$-thiazoline-2-spiro-4'-(1'- ethoxycarbonyl-2',2',6',6'-tetramethylpiperidine). |

The piperidino-thiazoline derivatives (I) employed as a stabilizer in the present invention may be readily incorporated into the synthetic polymers by any of the various standard procedures commonly utilized in the art. The stabilizer may be incorporated into the synthetic polymer at any desired stage prior to the manufacture of shaped articles therefrom. Thus, for example, the stabilizer in the form of a dry powder may be admixed with the synthetic polymer, or a suspension or emulsion of the stabilizer may be admixed with a solution, suspension or emulsion of the synthetic polymer.

The amount of the piperidino-thiazoline derivatives (I) employed in the synthetic polymer in accordance with the present invention may be varied widely, depending upon the types, properties and particular uses of the synthetic polymer to be stabilized. In general, the piperidino-thiazoline derivatives of the formula (I) may be added to the synthetic polymer in an amount ranging from 0.01 to 5.0% by weight, based on the amount of the synthetic polymer, but the practical range is varied depending upon the type of the synthetic polymer, for instance, 0.01 to 2.0% by weight, preferably 0.02 to 1.0% by weight for polyolefins, 0.01 to 1.0% by weight, preferably 0.02 to 0.5% by weight for polyvinyl chloride and polyvinylidene chloride, and 0.01 to 5.0% by weight, preferably 0.02 to 2.0% by weight for polyurethanes and polyamides.

If desired, two or more of the present stabilizers i.e. the piperidino-thiazoline derivaties of the formula (I) may also be satisfactorily used in this invention.

Moreover, the piperidino-thiazoline derivatives of the formula (I) may be used alone or in combination with other known additives, such as antioxidants, ultraviolet absorbers, fillers, pigments and the like.

Examples of the antioxidants which may be employed in this invention are 2,6-di-tert.-butyl-p-cresol,
4,4'-thiobis(3-methyl-6-tert.-butylphenol),
2,2'-thiobis(4-methyl-6-tert.-butylphenol),
4,4'-bis(2,6-di-tert.-butylphenol),
4,4'-bis(2,6-diisopropylphenol),
2,4,6-triisopropylphenol,
4,4'-butylidenebis(3-methyl-6-tert.-butylphenol),
1,1,3-tris(2-methyl-4-hydroxy-5-tert.butylphenol)
  butane, tetrakis[β-(3,5-di-tert.-butyl-4-
  hydroxyphenyl)propyloxymethyl]methane,
1,3,5-tris(4-hydroxy-3,5-di-tert.-butylbenzyl)2,4,6-
  trimethylbenzene,
trisnoyl phenyl phosphite,
triphenyl phosphite,
diphenyl decyl phosphite and
dilauryl thiodipropionate.

Examples of the ultraviolet absorbers which may be employed in this invention are, 4-tert.-butylphenyl salicylate,
2',4'-di-tert.-butylphenyl 3,5-di-tert.-butyl-4-hydroxy-
  benzoate,
2-hydroxy-4-octoxybenzophenone,
2-(2'-hydroxy-3',5'-di-tert.-butylphenyl)-5-
  chlorobenzotriazole, 2-(2'-hydroxy-5'-methylphenyl)benzotriazole,
methyl α-cyano-β-methyl-β-(p-methoxyphenyl) acrylate,
[2,2'-thiobis(4-tert.-octylphenolate)]-n-butylamine nickel (III) complex.

Other commercially available antioxidants and ultraviolet absorbers may also be satisfactorily employed with the piperidino-thiazoline derivatives (I) in this invention.

Such known additives as described above may be advantageously employed in this invention together with the piperidino-thiazoline derivatives (I) at a ratio of 0.5–3 to 1.

In still another aspect of this invention, while the piperidino-thiazoline derivatives having the above formula (I) wherein R and $R_1$ are the same and each represents hydrogen atom or methyl group are known in the art by F. Asinger et al. in the Monatschefte für Chemie, 99, 1436–1451 (1968), the piperidino-thiazoline derivatives having the above formula (II) are all new compounds not disclosed in the prior art literatures, as pointed out hereinabove.

These new piperidino-thiazoline derivatives (II) may be prepared according to the teachings of the above-cited literature by the process as illustratively shown in the following reaction schema.

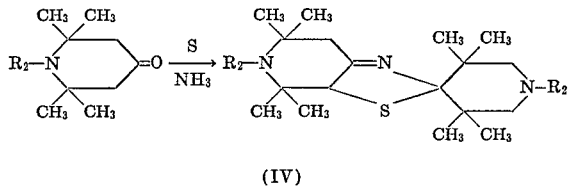

(IV)

In the above formulae, $R_2$ is as defined above.

The above process can be advantageously effected by reacting the starting compound (IV) with elementary sulfur in a suitable solvent with the introduction of gaseous ammonia.

The details of the reaction procedures and conditions, including the reaction solvent, temperature, period and the manner for recovering the end product may be substantially the same as taught in the above-cited literature.

Alternatively, the new piperidino-thiazoline derivatives (II) may be also readily prepared according to the process which comprises reacting the starting compound having the formula

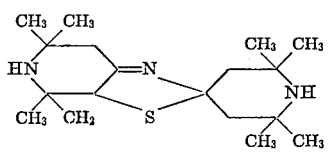

with the corresponding halide in the absence or presence of an inert organic solvent. As the solvent may be satisfactorily utilized any of the inert organic solvents that would not adversely affected the reaction. Examples of such solvents are aromatic hydrocarbons, e.g., benzene, toluene and xylene, amides, e.g., dimethylformamide and ethers, e.g., dioxane and tetrahydrofuran. The reaction temperature is not critical in this process, but the reaction may be usually conducted at a temperature ranging from room temperature to a reflux temperature of the solvent employed. Unless the solvent is present, the reaction is usually conducted at a boiling temperature of the halide employed. The reaction period of time is not critical, too, but the reaction may be usually effected within about 2–48 hours.

The reaction in the alternative process may be favourably, and thus preferably, accelerated by the use of an acid binding agent. Examples of the acid binding agent are inorganic bases such as alkali metal carbonates, e.g., potassium carbonate and organic bases such as amines, e.g., triethnolamine and aromatic sulfonates, e.g., sodium or potassium p-toluenesulfonate. After completion of the reaction, the desired product may be easily recovered from the reaction mixture by a conventional means, for example, extraction, concentration and/or recrystallization.

In the following examples are more illustratively shown the synthetic polymer compositions and their excellent stabilization against deterioration as well as the preparation of some new piperidino-thiazoline derivatives. However these examples are given solely for the purpose of illustrating of this invention and should not be construed to be limiting the scope thereof. Examples 1 through 4 describe the synthetic polymer compositions and their stabilizing effects. Example 5 describes the preparation of the piperidino-thiazoline derivatives.

EXAMPLE 1

Into 100 parts of polycaprolactone type polyurethane ["E–5080," trade name, available from The Nippon Elastollan Industries Ltd., Japan] was incorporated 0.3 part of each of the test compounds indicated below. The resulting mixture was melted with heating and then molded into a sheet having a thickness of about 0.5 mm. The sheet thus formed was subjected to the exposure to ultraviolet ray at 45° C. for 15 hours in the fade meter prescribed in Japanese Industrial Standard JIS–1044 entitled "Testing Method of Color Fastness to Light of Dyed Textiles and Dyestuffs," Paragraph 3.8 (in English).

Thereafter, the coloration, retention of elongation and retention of tensile strength of the exposed sheet were measured by means of conventional methods.

The results are summarized in the following Table I.

TABLE I

| No. of test compound: | Coloration | Retention of elongation (percent) | Retention of tensile strength (percent) |
|---|---|---|---|
| 1 | Colorless | 89 | 86 |
| 2 | do | 98 | 96 |
| 3 | do | 94 | 98 |
| 4 | do | 96 | 97 |
| 5 | do | 98 | 97 |
| 13 | do | 95 | 97 |
| 14 | do | 95 | 95 |
| None | do | 73 | 57 |

EXAMPLE 2

Into 100 parts of polypropylene ["Noblen JHH–G," trade name, available from Mitsui Toatsu Chemicals Inc., Japan, employed after twice recrystallizations from monochlorobenzene] was incorporated 0.25 part of each of the test compounds indicated below. The resulting mixture was admixed and melted and then molded into a sheet having a thickness of 0.5 mm. under heating and pressure.

The sheet thus formed was subjected to the exposure to ultraviolet irradiation at 45° C. in the fade meter as prescribed in the above Example 1 and the time required until the sheet becomes brittle was measured.

The results are summarized in the following Table II.

TABLE II

| No. of test compound: | Brittleness time (hour) |
|---|---|
| 1 | 580 |
| 2 | 580 |
| 5 | 520 |
| 6 | 480 |
| 13 | 560 |
| None | 40 |

EXAMPLE 3

Into 100 parts of high-density polyethylene ["Hi-Zex," trade name, available from Mitsui Toatsu Chemicals Inc., Japan, employed after twice recrystallizations from toluene] was incorporated 0.25 part of each of the test compounds indicated below. The resulting mixture was made into a sheet by the same procedure as in the above Example 1.

The sheet thus formed was tested for the brittleness time by the same test method as in the above Example 2.

The results are summarized in the following Table III.

TABLE III

| No. of test compound: | Brittleness time (hour) |
|---|---|
| 1 | 920 |
| 2 | 1240 |
| 5 | 1100 |
| 13 | 1240 |
| None | 380 |

EXAMPLE 4

Into 100 parts of polyvinyl chloride ["Geon–103 EP," trade name, available from The Japanese Geon Co., Ltd., Japan] were incorporated 30 parts of ABS resin ["ABS 60," trade name, available from The Japan Synthetic Rubber Co., Ltd., Japan], 3 parts of tribasic lead sulfate, 2 parts of dibasic lead phosphate, 2 parts of lead stearate and 1 part of each of the test compounds indicated below. The resulting mixture was blended and kneaded for 8 minutes on a kneading roll at 160° C. and then formed into a sheet having a thickness of about 0.5 mm.

The sheet thus formed was exposed to artificial sunlight in a sunshine Weather-Ometer for 50 hours and then subjected to a tensile test to measure the retentions of elongation and of tensile strength thereof.

The results are summarized in the following Table IV.

TABLE IV

| No. of test compound: | Retention of elongation (percent) | Retention of tensile strength (percent) |
|---|---|---|
| 1 | 57 | 88 |
| 2 | 58 | 83 |
| 3 | 57 | 88 |
| 5 | 62 | 86 |
| None | 43 | 81 |

It will be apparent from the above results that the piperidino-thiazoline derivatives (I) of this invention show excellent property for the stabilization of photo- and thermal-deteriorations of various synthetic polymers, especially polyurethanes.

EXAMPLE 5

5,5,7,7-Tetramethylpiperidino - [5.4-c] - Δ³ - thiazoline-2-spiro-4'-[2',2',6',6'-tetramethyl-1'-(2 - propynyl)piperidine]

A mixture of 25.9 g. of 5,5,7,7-tetramethylpiperidino-[5.4-c] - Δ³ - thiazoline - 2 - spiro - 4' - (2',2',6',6'-tetramethylpiperidine), 22 g. of potassium carbonate and 19.1 g. of propargyl bromide was heated to 60–65° C. for 10 hours.

After completion of the reaction, the reaction mixture was extracted with benzene, the benzene extract was washed with water, dried over anhydrous sodium sulfate and then concentrated. The residue was recrystallized from petroleum benzine to give the desired product as white crystals melting at 128–129° C.

Analysis for $C_{21}H_{35}N_3S$.—Calculated: C, 69.77%; H, 9.76%; N, 11.62%; S, 8.85%. Found: C. 69.55%; H, 10.00%; N, 11.62%; S, 8.86%.

Following the procedure as described hereinabove, those compounds as listed below were prepared:

5,5,7,7-tetramethylpiperidino-[5.4-c]-Δ³-thiazoline-2-spiro-4'-(2',2',6',6'-tetramethylpiperidine), m.p. 84–85° C.;

5,5,6,7,7-pentamethylpiperidino-[5.4-c]-Δ³-thiazoline-2-spiro-4'-(1',2',2',6',6'-pentamethylpiperidine), m.p. 80° C.;

6-benzyl-5,5,7,7-tetramethylpiperidino-[5.4-c]-Δ³-thiazoline-2-spiro-4'-(1'-benzyl-2',2',6',6'-tetramethylpiperidine), m.p. 173–174° C.; and 5,5,7,7-tetramethylpiperidino-[5.4-c]-Δ³-thiazoline-2-spiro-4'-[1'-(2-hydroxyethyl)-2',2',6',6'-tetramethylpiperidine], m.p. 143–145° C.

5,5,7,7-tetramethylpiperidino-[5.4-c]-Δ³-thiazoline-2-spiro-4'-(1'-allyl-2',2',6',6'-tetramethylpiperidine) m.p. 113–114° C.;

5,5,7,7-tetramethylpiperidino-[5.4-c]-Δ³-thiazoline-2-spiro-4'-(1'-acryloyl-2',2',6',6'-tetramethylpiperidine) m.p. 152–153° C.; and 6-acryloyl-5,5,7,7-tetramethylpiperidino-[5.4-c]-Δ³-thiazoline-2-spiro-4'-(1'-acryloyl-2',2',6',6'-tetramethylpiperidine) m.p. 167–168° C.

What is claimed is:

1. A synthetic polymer composition stabilized against photo- and thermal-deterioration wherein there is incorporated, in a sufficient amount to prevent said deterioration, at least one of the compounds having the formula

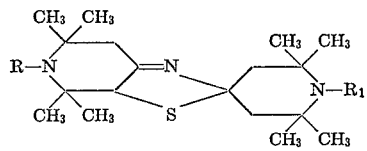

wherein R and $R_1$ may be the same or different and each represents hydrogen atom, an alkyl group, an alkenyl group, an alkynyl group, an aralkyl group, a hydroxyalkyl group, an alkoxyalkyl group with 1 to 8 carbon atoms in the alkoxy moiety, a saturated or unsaturated aliphatic or aromatic acryloxyalkyl group, an epoxyalkyl group, a cyanoalkyl group, a halogenoalkyl group or an alkoxycarbonylalkyl group with 1 to 8 carbon atoms in the alkoxy moiety, an aliphatic acyl group, an alkoxycarbonyl group or an aralkoxycarbonyl group.

2. The synthetic polymer composition according to claim 1 wherein said compound is selected from the compounds wherein each of R and $R_1$ is hydrogen atom, methyl group, allyl group, benzyl group, ethoxycarbonylmethyl group or acryloyl group.

3. The synthetic polymer composition according to claim 1 wherein said compound is incorporated in an amount of 0.01–5.0% by weight, based upon the amount of the synthetic polymer.

4. The synthetic polymer composition according to claim 1 wherein said polymer is a polyolefin.

5. The synthetic polymer composition according to claim 1 wherein said polymer is a polyvinyl chloride.

6. The synthetic polymer composition according to claim 1 wherein said polymer is a polyurethane.

7. The synthetic polymer composition according to claim 1 wherein said polymer is an acrylonitrile,styrene-butadiene copolymer.

8. The synthetic polymer composition according to claim 1 wherein said compound is selected from the group consisting of 5,5,7,7-tetramethylpiperidino-[5.4-c]-Δ³-thiazoline-2-spiro-4'-(2',2',6',6'-tetramethylpiperidino), 5,5,6,7,7-pentamethylpiperidino-[5.4-c]-Δ³-thiazoline-2-spiro-4'-(1',2',2',6',6'-pentamethylpiperidine), 6-allyl-5,5,7,7-tetramethylpiperidino-[5.4-c]-Δ³-thiazoline-2-spiro-4'-(1'-allyl-2',2',6',6'-tetramethylpiperidine), 6-benzyl-5,5,7,7-tetramethylpiperidino-[5.4-c]-Δ³-thiazoline-2-spiro-4'-(1'-benzyl-2',2',6',6'-tetramethylpiperidine), 6-ethoxycarbonylmethyl-5,5,7,7-tetramethylpiperidino-[5.4-c]-Δ³-thiazoline-2-spiro-4'-(1'-ethoxycarbonylmethyl-2',2',6',6'-tetramethylpiperidine) and 6-acryloyl-5,5,7,7-tetramethylpiperidino-[5.4-c]-Δ³-thiazoline-2-spiro-4'-(1'-acryloyl-2',2',6',6'-tetramethylpiperidine).

References Cited

UNITED STATES PATENTS

| | | | |
|---|---|---|---|
| 3,097,100 | 7/1963 | Lappin et al. | 106—176 |
| 3,431,233 | 3/1969 | Murayama et al. | 260—45.8 |
| 3,501,437 | 3/1970 | Digiaimo | 260—45.8 |

OTHER REFERENCES

Asinger et al.: Chem. Abs., vol. 69, 1968, 96552E.

DONALD E. CZAJA, Primary Examiner

R. A. WHITE, Assistant Examiner

U.S. Cl. X.R.

260—77.5 SS, 293.55, 880 R